J. R. Remington,
Horse Power.
Nº 4,590.   Patented June 20, 1846.

UNITED STATES PATENT OFFICE.

J. R. REMINGTON, OF LOWNDES COUNTY, ALABAMA.

HORSE POWER.

Specification of Letters Patent No. 4,590, dated June 20, 1846.

*To all whom it may concern:*

Be it known that I, J. R. REMINGTON, of the county of Lowndes and State of Alabama, have invented new and useful Improvements in Horse-Powers, and that the following is a full, clear, and exact description of the principle or character thereof which distinguishes them from all other things before known and of the manner of making, constructing, and using the same, reference being had to the accompanying drawings, making part of this specification, in which—

Figure 1:
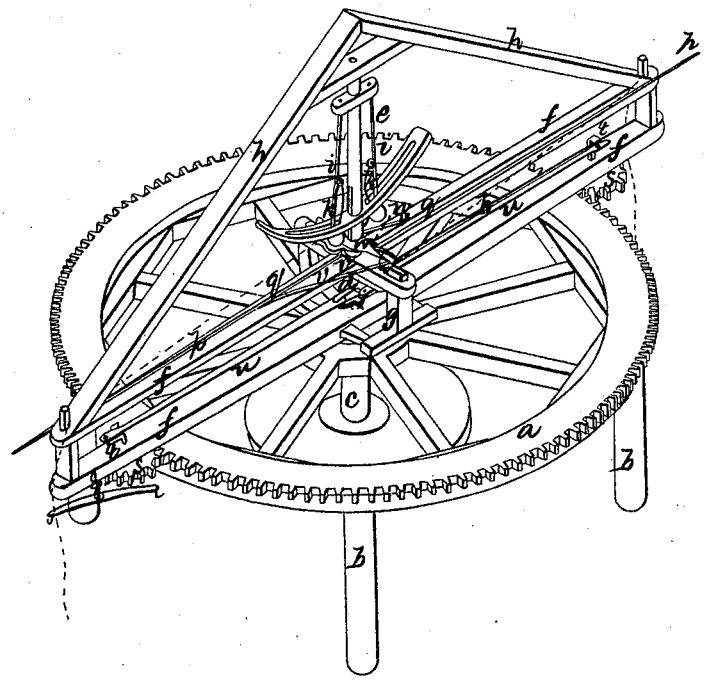
Figure 1:
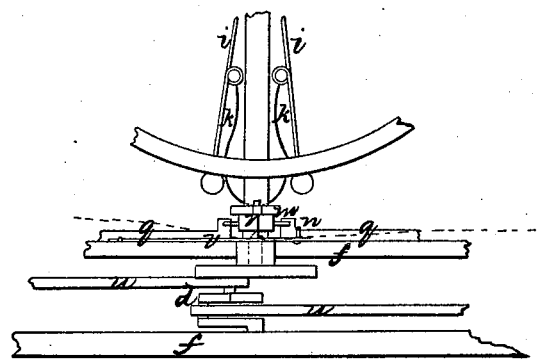

Figure 1, is a perspective view of the machine for two horses.

The nature of my improvements consist in regulating the speed of the horses in the mill by the machinery without the aid of a driver, by which the service of one hand is saved or nearly so. Its construction is as follows: a stationary spur wheel ($a$) is supported on four or more posts ($b$), at the center of this wheel a shaft ($c$) is situated which is vertical and moves independent of it, on the shaft ($c$) above the wheel ($a$) there is a double crank ($d$) one part of which is at right-angles to the other, the upper part of the shaft extends up some distance, is tapered and has connected with it, the common flying ball regulator ($e$).

The shaft above the wheel ($a$) passes through two pieces of timber ($f$) parallel with each other, one above and the other below the above mentioned crank; these timbers extend out beyond the wheel ($a$) and serve as a sweep for the horses to draw by. These timbers or sweeps are connected at each end, and in the middle by a small cross frame ($g$), and above them are two inclined or bracing pieces ($h$) that extend from each end, up to the center, when they join like rafters, these serve to support the upper end of the shaft ($c$).

The arms ($i$) of the regulator are connected by a cord ($k$) with a ring ($l$) on which are two cams ($n$) the ring has a motion up and down on the shaft, but turns with it; above the ring ($l$) is another one ($m$) with two arms to it, to each of which arms a string or rein ($o$) is attached that passes down through an eye or cross frame ($g$) underneath and thence out through an eye at the end of the sweep from which it is carried to the check rein of the horse, (not represented in the drawing.)

The rein is shown in red lines, by this contrivance as the horses move on if they go too fast, the arms ($i$) of the regulator rise and draw up the ring ($m$) shorten the rein, and thus check the horses. If the horse moves too slow he is whipped up by the following device: two rods ($p$) are affixed by pivots at ($q$) to the upper beam ($f$) of the sweep, these rods are held parallel with the said beam by springs ($v$) and when the horses are going at a proper speed they are at rest, but if the horses go too slow, the balls of the regulator fall, and the ring ($l$) having on it the cams ($n$) fall slow enough for the cams to come in contact with the end of the rod ($p$) and cause them to strike the horse.

Motion is communicated by means of the pinions ($s$) that are connected with the sweep, and work into the wheel ($a$). On the shafts of said pinions are cranks ($t$) which are connected by a rod ($u$) with the double crank ($d$) at the center as above described. The construction and operation of this part of the machine not being new a further description is deemed unnecessary.

Having thus fully described my improvements what I claim therein as new and for which I desire to secure Letters Patent is—

The employment of my apparatus for whipping or checking the horses by means of the regulator substantially in the manner and for the purpose set forth.

JOHN R. REMINGTON.

Witnesses:
J. J. GREENOUGH,
A. P. BROWNE.